(12) United States Patent
Tung et al.

(10) Patent No.: US 11,158,121 B1
(45) Date of Patent: Oct. 26, 2021

(54) SYSTEMS AND METHODS FOR GENERATING ACCURATE AND REALISTIC CLOTHING MODELS WITH WRINKLES

(71) Applicant: Oculus VR, LLC, Menlo Park, CA (US)

(72) Inventors: Tony Tung, San Francisco, CA (US); Zorah Lähner, Sausalito, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 631 days.

(21) Appl. No.: 15/977,979

(22) Filed: May 11, 2018

(51) Int. Cl.
*G06T 17/20* (2006.01)
*G06F 30/20* (2020.01)
(Continued)

(52) U.S. Cl.
CPC .............. *G06T 17/20* (2013.01); *G06F 17/18* (2013.01); *G06F 30/20* (2020.01); *G06N 7/00* (2013.01); *G06N 20/00* (2019.01); *G06T 13/40* (2013.01); *G06T 15/04* (2013.01); *G06F 2113/12* (2020.01); *G06Q 30/0643* (2013.01); *G06T 17/00* (2013.01); *G06T 19/20* (2013.01); *G06T 2207/10028* (2013.01);
(Continued)

(58) Field of Classification Search
CPC ......... G06T 17/20; G06T 15/04; G06T 13/40; G06T 19/20; G06T 2210/16; G06T 2215/16; G06T 19/00; G06T 2207/10028; G06T 17/00; G06T 2207/20084; G06T 13/20; G06T 15/00; G06T 2219/2004; G06N 99/00; G06N 7/00; G06N 20/00; G06N 3/08; G06F 17/18; G06F 2113/12; G06F 30/20; G06Q 30/0643
See application file for complete search history.

(56) References Cited

U.S. PATENT DOCUMENTS 8,654,121 B1 * 2/2014 Yu .................. G06T 17/205
345/423
8,665,261 B1 * 3/2014 Baraff ................. G06T 7/344
345/419

(Continued)

OTHER PUBLICATIONS

Kim, Taeksoo, et al. "Learning to discover cross-domain relations with generative adversarial networks." arXiv preprint arXiv: 1703. 05192 (2017).*

(Continued)

*Primary Examiner* — Kibrom K Gebresilassie
(74) *Attorney, Agent, or Firm* — Baker Botts L.L.P.

(57) ABSTRACT

In one embodiment, a computing system may be configured to generate accurate and realistic computer-generated clothing for a given body pose. For example, the system may access a data representation of a body pose and generate, based on the data representation, a 3D clothing model for the body pose using a statistical model. The system may generate a first normal map, such as a low-resolution normal map, based on the 3D clothing model. The system may generate a second normal map, such as a high-resolution normal map, by processing the first normal map using a machine-learning model that is trained to generate normal maps with higher levels of detail from normal maps with relatively lower levels of detail. The system may then render clothing for the body pose based on the 3D clothing model and the second normal map.

20 Claims, 13 Drawing Sheets

(51) Int. Cl.

| | | |
|---|---|---|
| *G06T 15/04* | (2011.01) | |
| *G06T 13/40* | (2011.01) | |
| *G06F 17/18* | (2006.01) | |
| *G06N 7/00* | (2006.01) | |
| *G06N 20/00* | (2019.01) | |
| *G06T 19/20* | (2011.01) | |
| *G06T 17/00* | (2006.01) | |
| *G06F 113/12* | (2020.01) | |
| *G06Q 30/06* | (2012.01) | |

(52) U.S. Cl.
CPC ...... *G06T 2210/16* (2013.01); *G06T 2210/36* (2013.01); *G06T 2215/16* (2013.01)

(56) References Cited

U.S. PATENT DOCUMENTS

| | | | | |
|---|---|---|---|---|
| 9,305,387 | B2* | 4/2016 | Corazza | G06T 13/40 |
| 10,679,046 | B1* | 6/2020 | Black | G06N 3/084 |
| 10,909,744 | B1* | 2/2021 | Stuyck | G06F 30/27 |
| 2005/0052461 | A1* | 3/2005 | Vassilev | G06T 13/40 |
| | | | | 345/473 |
| 2010/0164862 | A1* | 7/2010 | Sullivan | G06T 7/246 |
| | | | | 345/156 |
| 2013/0046522 | A1* | 2/2013 | Kavan | G06T 13/20 |
| | | | | 703/6 |
| 2014/0333614 | A1* | 11/2014 | Black | G06T 19/20 |
| | | | | 345/419 |
| 2015/0134495 | A1* | 5/2015 | Naware | A41H 1/00 |
| | | | | 705/27.2 |
| 2015/0242546 | A1* | 8/2015 | Jeon | G06F 30/20 |
| | | | | 703/2 |
| 2016/0110595 | A1* | 4/2016 | Wang | G06K 9/6201 |
| | | | | 705/27.2 |
| 2018/0012407 | A1* | 1/2018 | Chuang | G06T 7/75 |
| 2018/0181802 | A1* | 6/2018 | Chen | G06N 3/0454 |
| 2018/0197331 | A1* | 7/2018 | Chen | G06F 30/20 |
| 2018/0240280 | A1* | 8/2018 | Chen | G06T 7/564 |
| 2019/0371080 | A1* | 12/2019 | Sminchisescu | G06T 19/00 |

OTHER PUBLICATIONS

Allen, Brett. Learning body shape models from real-world data. University of Washington, 2005.*

W. W. Feng, Y. Yu, B. U. Kim, "A Deformation Transformer for Real-Time Cloth Animation" pp. 1-8, (Year: 2010).*

P. Guan, L. Reiss, D. A. Hirshberg, A. Weiss, M. J. Black, "DRAPE: Dressing any Person" pp. 35:1-35:10, (Year: 2012).*

3dMD Systems (4D), T.: www.3dmd.com. (2018).

Muller, M., Chentanez, N.: Wrinkle meshes. In: Proceedings of the 2010 ACM SIGGRAPH/Eurographics Symposium on Computer Animation. SCA '10, Aire-laVille, Switzerland, Switzerland, Eurographics Association (2010) 85-92.

Kavan, L., Gerszewski, D., Bargteil, A.W., Sloan, P.P.: Physics-inspired upsampling for cloth simulation in games. ACM Trans. Graph. 30(4) (Jul. 2011) 93:1-93:10.

Guan, P., Reiss, L., Hirshberg, D.A., Weiss, A., Black, M.J.: DRAPE: dressing any person. ACM Trans. Graph. 31(4) (2012) 35:1-35:10.

Sumner, R.W., Popovi c, J.: Deformation transfer for triangle meshes. ACM Trans. Graph. 23(3) (Aug. 2004) 399-405.

Tung, T., Matsuyama, T.: Intrinsic characterization of dynamic surfaces. In: 2013 IEEE Conference on Computer Vision and Pattern Recognition, Portland, OR, USA, Jun. 23-28, 2013. (2013) 233-240.

Danek, R., Dibra, E., ztireli, C., Ziegler, R., Gross, M.: Deepgarment : 3d garment shape estimation from a single image. Computer Graphics Forum 36(2) (2017) 269-280.

Saito, S., Wei, L., Hu, L., Nagano, K., Li, H.: Photorealistic facial texture inference using deep neural networks. In: 2017 IEEE Conference on Computer Vision and Pattern Recognition, CVPR 2017, Honolulu, HI, USA, Jul. 21-26, 2017. (2017) 2326-2335.

Olszewski, K., Li, Z., Yang, C., Zhou, Y., Yu, R., Huang, Z., Xiang, S., Saito, S., Kohli, P., Li, H.: Realistic dynamic facial textures from a single image using gans. In: IEEE International Conference on Computer Vision, ICCV 2017, Venice, Italy, Oct. 22-29, 2017. (2017) 5439-5448.

Goodfellow, I.J., Pouget-Abadie, J., Mirza, M., Xu, B., Warde-Farley, D., Ozair, S., Courville, A.C., Bengio, Y.: Generative adversarial nets. In: Advances in Neural Information Processing Systems 27: Annual Conference on Neural Information Processing Systems 2014, Dec. 8-13, 2014, Montreal, Quebec, Canada. (2014) 2672-2680.

Lassner, C., Pons-Moll, G., Gehler, P.V.: A generative model of people in clothing. In: IEEE International Conference on Computer Vision, ICCV 2017, Venice, Italy, Oct. 22-29, 2017. (2017) 853-862.

Ledig, C., Theis, L., Huszar, F., Caballero, J., Cunningham, A., Acosta, A., Aitken, A.P., Tejani, A., Totz, J., Wang, Z., Shi, W.: Photo-realistic single image superresolution using a generative adversarial network. In: 2017 IEEE Conference on Computer Vision and Pattern Recognition, CVPR 2017, Honolulu, HI, USA, Jul. 21-26, 2017. (2017) 105-114.

Chu, M., Thuerey, N.: Data-driven synthesis of smoke ows with cnn-based feature descriptors. ACM Trans. Graph. 36(4) (Jul. 2017) 69:1-69:14.

Isola, P., Zhu, J., Zhou, T., Efros, A.A.: Image-to-image translation with conditional adversarial networks. In: 2017 IEEE Conference on Computer Vision and Pattern Recognition, CVPR 2017, Honolulu, HI, USA, Jul. 21-26, 2017. (2017) 5967-5976.

Krishnamurthy, V., Levoy, M.: Fitting smooth surfaces to dense polygon meshes. In: Proceedings of the 23rd Annual Conference on Computer Graphics and Interactive Techniques, SIGGRAPH 1996, New Orleans, LA, USA, Aug. 4-9, 1996. (1996) 313-324.

Miguel, E., Bradley, D., Thomaszewski, B., Bickel, B., Matusik, W., Otaduy, M.A., Marschner, S.: Data-driven estimation of cloth simulation models. Comput. Graph. Forum 31(2) (2012) 519-528.

Bradley, D., Popa, T., She er, A., Heidrich, W., Boubekeur, T.: Markerless garment capture. ACM Trans. Graph. 27(3) (Aug. 2008) 99:1-99:9.

De Aguiar, E., Stoll, C., Theobalt, C., Ahmed, N., Seidel, H., Thrun, S.: Performance capture from sparse multi-view video. ACM Trans. Graph. 27(3) (2008) 98:1-98:10.

Tung, T., Nobuhara, S., Matsuyama, T.: Simultaneous super-resolution and 3d video using graph-cuts. In: 2008 IEEE Computer Society Conference on Computer Vision and Pattern Recognition (CVPR 2008), Jun. 24-26, 2008, Anchorage, Alaska, USA. (2008).

Goldlucke, B., Cremers, D.: Superresolution texture maps for multiview reconstruction. In: IEEE 12th International Conference on Computer Vision, ICCV 2009, Kyoto, Japan, Sep. 27-Oct. 4, 2009. (2009) 1677-1684 16 ECCV-18 submission ID 1507.

Tsiminaki, V., Franco, J., Boyer, E.: High resolution 3d shape texture from multiple videos. In: 2014 IEEE Conference on Computer Vision and Pattern Recognition, CVPR 2014, Columbus, OH, USA, Jun. 23-28, 2014. (2014) 1502-1509.

Hernandez, C., Vogiatzis, G., Brostow, G.J., Stenger, B., Cipolla, R.: Non-rigid photometric stereo with colored lights. In: IEEE 11th International Conference on Computer Vision, ICCV 2007, Rio de Janeiro, Brazil, Oct. 14-20, 2007. (2007) 1-8.

Vlasic, D., Peers, P., Baran, I., Debevec, P., Popovi c, J., Rusinkiewicz, S., Matusik, W.: Dynamic shape capture using multi-view photometric stereo. In: ACM SIGGRAPH Asia 2009 Papers. SIGGRAPH Asia '09, New York, NY, USA, ACM (2009) 174:1-174:11.

Newcombe, R.A., Fox, D., Seitz, S.M.: Dynamicfusion: Reconstruction and tracking of non-rigid scenes in real-time. In: IEEE Conference on Computer Vision and Pattern Recognition, CVPR 2015, Boston, MA, USA, Jun. 7-12, 2015. (2015) 343-352.

Dou, M., Khamis, S., Degtyarev, Y., Davidson, P., Fanello, S.R., Kowdle, A., Escolano, S.O., Rhemann, C., Kim, D., Taylor, J., Kohli, P., Tankovich, V., Izadi, S.: Fusion4d: Real-time performance capture of challenging scenes. ACM Trans. Graph. 35(4) (Jul. 2016) 114:1{114:13.

(56) References Cited

OTHER PUBLICATIONS

Aguiar, E.D., Sigal, L., Treuille, A., Hodgins, J.: Stable spaces for real-time clothing. ACM Transactions on Graphics (2010) Proceedings of ACM SIGGRAPH 2010.
Hahn, F., Thomaszewski, B., Coros, S., Sumner, R.W., Cole, F., Meyer, M., DeRose, T., Gross, M.H.: Subspace clothing simulation using adaptive bases. ACM Trans. Graph. 33(4) (2014) 105:1-105:9.
Wang, H., Hecht, F., Ramamoorthi, R., O'Brien, J.F.: Example-based wrinkle synthesis for clothing animation. ACM Transactions on Graphics 29(4) (Jul. 2010) 107:1{8 Proceedings of ACM SIGGRAPH 2010, Los Angles, CA.
Pons-Moll, G., Pujades, S., Hu, S., Black, M.: Clothcap: Seamless 4d clothing capture and retargeting. ACM Transactions on Graphics, (Proc. SIGGRAPH) 36(4). (2017).
Volino, P., Magnenat-Thalmann, N.: Virtual clothing—theory and practice. Springer (2000).
Choi, K.J., Ko, H.S.: Stable but responsive cloth. In: Proceedings of the 29th Annual Conference on Computer Graphics and Interactive Techniques. SIGGRAPH '02, New York, NY, USA, ACM (2002) 604-611.
Bridson, R., Marino, S., Fedkiw, R.: Simulation of clothing with folds and wrinkles. In: Proceedings of the 2003 ACM SIGGRAPH/Eurographics Symposium on Computer Animation, San Diego, CA, USA, Jul. 26-27, 2003 28-36.
Baraff, D., Witkin, A., Kass, M.: Untangling cloth. ACM Trans. Graph. 22(3) (Jul. 2003) 862-870.
Goldenthal, R., Harmon, D., Fattal, R., Bercovier, M., Grinspun, E.: E cient simulation of inextensible cloth. ACM Trans. Graph. 26(3) (2007) 49.
MarvelousDesigner: www.marvelousdesigner.com. (2018).
Wang, H., Ramamoorthi, R., O'Brien, J.F.: Data-driven elastic models for cloth: Modeling and measurement. ACM Transactions on Graphics 30(4) (Jul. 2011) 71:1-11 Proceedings of ACM SIGGRAPH 2011, Vancouver, BC Canada.
Leroy, V., Franco, J., Boyer, E.: Multi-view dynamic shape re nement using local temporal integration. In: IEEE International Conference on Computer Vision, ICCV 2017, Venice, Italy, Oct. 22-29, 2017. (2017) 3113-3122.
White, R., Crane, K., Forsyth, D.A.: Capturing and animating occluded cloth. ACM Trans. Graph. 26(3) (2007) 34.
Tung, T., Nobuhara, S., Matsuyama, T.: Complete multi-view reconstruction of dynamic scenes from probabilistic fusion of narrow and wide baseline stereo. In: IEEE 12th International Conference on Computer Vision, ICCV 2009, Kyoto, Japan, Sep. 27-Oct. 4, 2009. (2009) 1709-1716.
Starck, J., Hilton, A.: Surface capture for performance-based animation. IEEE Computer Graphics and Applications 27(3) (2007) 21-31.
Vlasic, D., Baran, I., Matusik, W., Popovi c, J.: Articulated mesh animation from multi-view silhouettes. In: ACM SIGGRAPH 2008 Papers. SIGGRAPH '08, New York, NY, USA, ACM (2008) 97:1-97:9.
Cohen, J.D., Olano, M., Manocha, D.: Appearance-perserving simpli cation. In: Proceedings of the 25th Annual Conference on Computer Graphics and Interactive Techniques, SIGGRAPH 1998, Orlando, FL, USA, Jul. 19-24, 1998. (1998) 115-122.
Cignoni, P., Montani, C., Scopigno, R., Rocchini, C.: A general method for preserving attribute values on simpli ed meshes. In: Visualization '98, Proceedings, Oct. 18-23, 1998, Research Triangle Park, North Carolina, USA. (1998) 59-66.
Beeler, T., Hahn, F., Bradley, D., Bickel, B., Beardsley, P., Gotsman, C., Sumner, R.W., Gross, M.: High-quality passive facial performance capture using anchor frames. ACM Trans. Graph. 30 (Aug. 2011) 75:1-75:10.
Fyffe, G., Nagano, K., Huynh, L., Saito, S., Busch, J., Jones, A., Li, H., Debevec, P.: Multi-view stereo on consistent face topology. Comput. Graph. Forum 36(2) (May 2017) 295-309.
Loper, M., Mahmood, N., Romero, J., Pons-Moll, G., Black, M.J.: SMPL: a skinned multi-person linear model. ACM Trans. Graph. 34(6) (2015) 248:1-248:16.
Stoll, C., Hasler, N., Gall, J., Seidel, H.P., Theobalt, C.: Fast articulated motion tracking using a sums of gaussians body model. In: 2011 International Conference on Computer Vision. (Nov. 2011) 951-958.
Shotton, J., Fitzgibbon, A., Blake, A., Kipman, A., Finocchio, M., Moore, B., Sharp, T.: Real-time human pose recognition in parts from a single depth image, IEEE (Jun. 2011).
Mehta, D., Sridhar, S., Sotnychenko, O., Rhodin, H., Sha ei, M., Seidel, H.P., Xu, W., Casas, D., Theobalt, C.: Vnect: Real-time 3d human pose estimation with a single rgb camera. vol. 36. (2017).
Zhang, C., Pujades, S., Black, M.J., Pons-Moll, G.: Detailed, accurate, human shape estimation from clothed 3d scan sequences. In: 2017 IEEE Conference on Computer Vision and Pattern Recognition, CVPR 2017, Honolulu, HI, USA, Jul. 21-26, 2017. (2017) 5484-5493.
Li, H., Adams, B., Guibas, L.J., Pauly, M.: Robust single-view geometry and motion reconstruction. ACM Trans. Graph. 28(5) (Dec. 2009) 175:1-175:10 18 ECCV-18 submission ID 1507.
Guo, K., Xu, F., Wang, Y., Liu, Y., Dai, Q.: Robust non-rigid motion tracking and surface reconstruction using l0 regularization. 2015 IEEE International Conference on Computer Vision (ICCV) (2015) 3083-3091.
Pons-Moll, G., Romero, J., Mahmood, N., Black, M.J.: Dyna: A model of dynamic human shape in motion. ACM Transactions on Graphics, (Proc. SIGGRAPH) 34(4) (Aug. 2015) 120:1-120:14.
Sutskever, I., Vinyals, O., Le, Q.V.: Sequence to sequence learning with neural networks. In: Advances in Neural Information Processing Systems 27: Annual Conference on Neural Information Processing Systems 2014, Dec. 8-13, 2014, Montreal, Quebec, Canada. (2014) 3104-3112.
Bogo, F., Romero, J., Pons-Moll, G., Black, M.J.: Dynamic FAUST: Registering human bodies in motion. In: IEEE Conf. on Computer Vision and Pattern Recognition (CVPR). (Jul. 2017).
Ioffe, S., Szegedy, C.: Batch normalization: Accelerating deep network training by reducing internal covariate shift. In: Proceedings of the 32Nd International Conference on International Conference on Machine Learning—vol. 37. ICML'15, JMLR.org (2015) 448-456.

\* cited by examiner

SYSTEMS AND METHODS FOR GENERATING ACCURATE AND REALISTIC CLOTHING MODELS WITH WRINKLES

FIELD OF THE INVENTION

This disclosure relates to the field of computer image processing, and more particularly to a technique for computer-generated graphics.

BACKGROUND

Computer-generated graphics has become ubiquitous and are commonly seen in artificial reality experiences (e.g., augmented reality and virtual reality), movies, video games, virtual dressing rooms, etc. Often, the goal of a computer-generated scene is to create virtual realism that viewers have come to expect in the real world. For example, to create a virtual scene, a computer may render buildings, vehicles, and robots based on three-dimensional models of their corresponding structures. Rigid objects, such as those mentioned, may be moved and oriented across time to create computer-generated animation. Since rigid objects have defined structures that generally do not change due to time, position, orientation, or other environment factors, it is relatively simple to render rigid objects that look realistic. In contrast, the appearance of non-rigid objects, such as garments, is mutable, ever-changing, and difficult to predict. In the real world, garments are expected to wrinkle when worn. The appearance of a person's clothing wrinkles dependent on a variety of factors, including the person's body shape, body movement, clothing material, environmental factors (e.g., wind, humidity, etc.), among others. As such, generating realistic-looking garment, especially in animation, is particularly difficult and computationally expensive. Moreover, in performance-driven animation where scenes are generated dynamically based on real-time feedback (e.g., such as in virtual reality and/or games), the difficulty level of generating realistic clothing is further amplified due to the limited time available for rendering each frame in the animation.

SUMMARY OF PARTICULAR EMBODIMENTS

The subject matter described herein provides an automated process for generating accurate and realistic clothing deformation from real data capture. Previous methods for realistic cloth modeling mainly rely on intensive computation of physics-based simulation (with numerous heuristic parameters), while models reconstructed from visual observations typically suffer from lack of geometric details. In particular embodiments, a novel framework is presented to generate accurate and realistic clothing deformation from real data capture using a deep neutral network. The framework comprises two modules that work jointly to represent global shape deformation as well as surface details with high fidelity. The global shape deformations are recovered from a subspace model learned from 3D training data sequences of clothed people in motion, while high frequency details are added to normal (as used herein, "normal" is used in the geometric sense and relates to perpendicular properties of an object) maps created using a conditional Generative Adversarial Network whose architecture is designated to enforce realism and temporal consistency. This method leads to unprecedented high-quality rendering of clothing deformation sequences, where fine wrinkles from real high-resolution observations can be recovered. In addition, as the model is learned independently from body shape and pose, the framework is suitable for applications that require retargeting (e.g., body animation). The method shows original high-quality results with a flexible model, and particular embodiments enable an entirely data-driven approach to realistic cloth wrinkle generation.

Embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
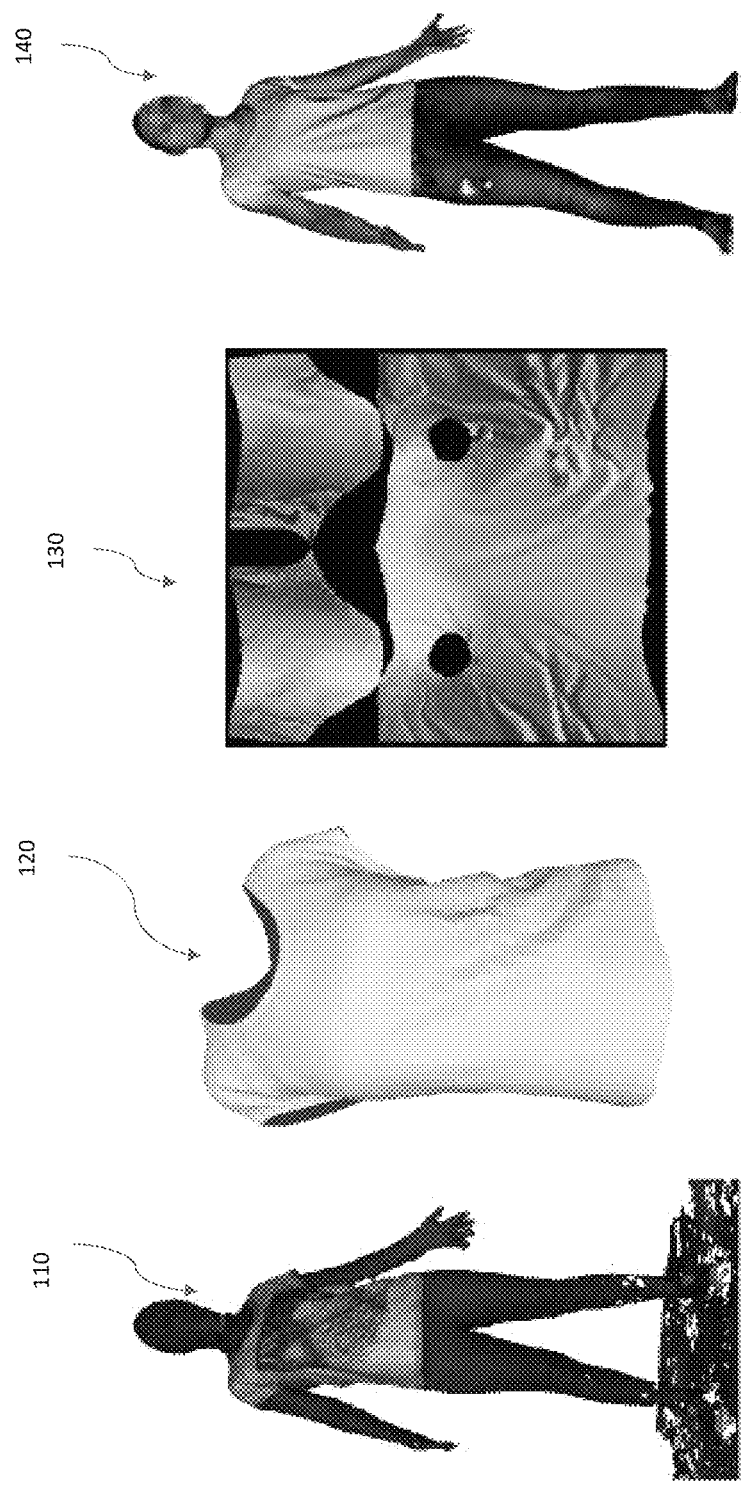
FIG. 1 illustrates examples of components used in and generated by the data-driven framework for generating accurate and realistic clothing models, in accordance with particular embodiments.

Realistic garment reconstruction is notoriously a complex problem and its importance is undeniable in many research work and applications, such as accurate body shape and pose estimation in the wild (i.e., from observations of clothed humans), realistic augmented reality (AR) and virtual reality (VR) experience, movies, video games, virtual try-on, etc.

Conventionally, clothing wrinkles are generated using physics-based simulation (e.g., using complex mathematical models based on Newtonian physics to model material properties such as stretch or tension, stiffness, and weight). For certain types of applications (e.g., involving human body), additional models or external forces have to be taken into account such as body kinematics, body surface friction, interpenetration, etc. The physics-based simulations typically require hours, days, or even weeks of computation, retouching work, and parameter tuning by experts to obtain realistic cloth deformation effects. As such, the physics-based approach is not suitable nor practical for real-time applications.

Conventional vision-based approaches have explored ways to capture cloth surface deformation through visual observations for simulation purpose, using texture patterns to track and reconstruct garment from a video. However, without sufficient prior, reconstructed geometry, vision-based approaches can be quite crude, and accurately recovering geometric details such as fine cloth wrinkles has remained a challenge.

Embodiments described herein, which may generally be referred to as DeepWrinkles, provide a novel framework and operating method thereof to generate accurate and realistic clothing deformation from real data capture. The framework and method thereof may comprise at least two complementary modules, a statistical model and machine-learning model (e.g., based on a conditional adversarial network). In particular embodiments, the statistical model may be learned from 3D scans of clothed people in motion, wherein the 3D scans can be precisely non-rigidly aligned with clothing templates. Clothing shape deformations therefore can be modeled using a linear subspace model, where human body shape and pose are factored out, hence enabling body retargeting. In particular embodiments, fine geometric details can be added to normal maps generated by using a conditional adversarial network whose architecture is designed to enforce realism and temporal consistency.

Particular embodiments described herein tackle 3D surface geometry refinement using deep neural network on normal maps for realistic garment reconstruction. With DeepWrinkles, unprecedented high-quality rendering of clothing deformation can be obtained, where global shape as well as fine wrinkles from real high-resolution observations can be recovered. Particular embodiments of DeepWrinkles may use a data-driven approach (e.g., without physics-based modeling). In order to represent a high level of detail at runtime, particular embodiments may leverage the rendering pipeline of a 3D engine (e.g., as used in computer vision). In particular embodiments, a normal mapping technique can be used to generate fine wrinkle details.

FIG. 1 illustrates examples of components used in and generated by the data-driven framework for generating accurate and realistic clothing models, in accordance with particular embodiments. In particular, FIG. 1 illustrates the example of framework of accurate and realistic clothing modeling with DeepWrinkles, showing how the model is applied to virtual human animation with body shape and pose retargeting. In general, the proposed framework may obtain high-resolution 4D data capture consisting of sequence of scanned 3D mesh model 110 of a garment worn by a person, learn to reconstruct a virtual garment 120 from a statistical subspace model based on the captured sequence of scanned 3D mesh model 110, learn to generate fine wrinkles 130 defined by a normal map by a machine-learning model (e.g., an adversarial neural network), and retarget the virtual garment 120 onto a subject 140. The high-resolution 4D data capture can be achieved by various methods including a high-resolution 3D data capture in motion. The reconstructed virtual garment 120 can be obtained by learning the statistical subspace model from the high-resolution 4D data capture. The reconstructed virtual garment 120 can be added on top of the subject 140 (e.g. a 3D virtual human) by pose retargeting, and the fine wrinkles 130 can be incorporated for creating accurate and realistic clothing deformation of the virtual garment 120, using particular embodiments described herein.

Figure 2:
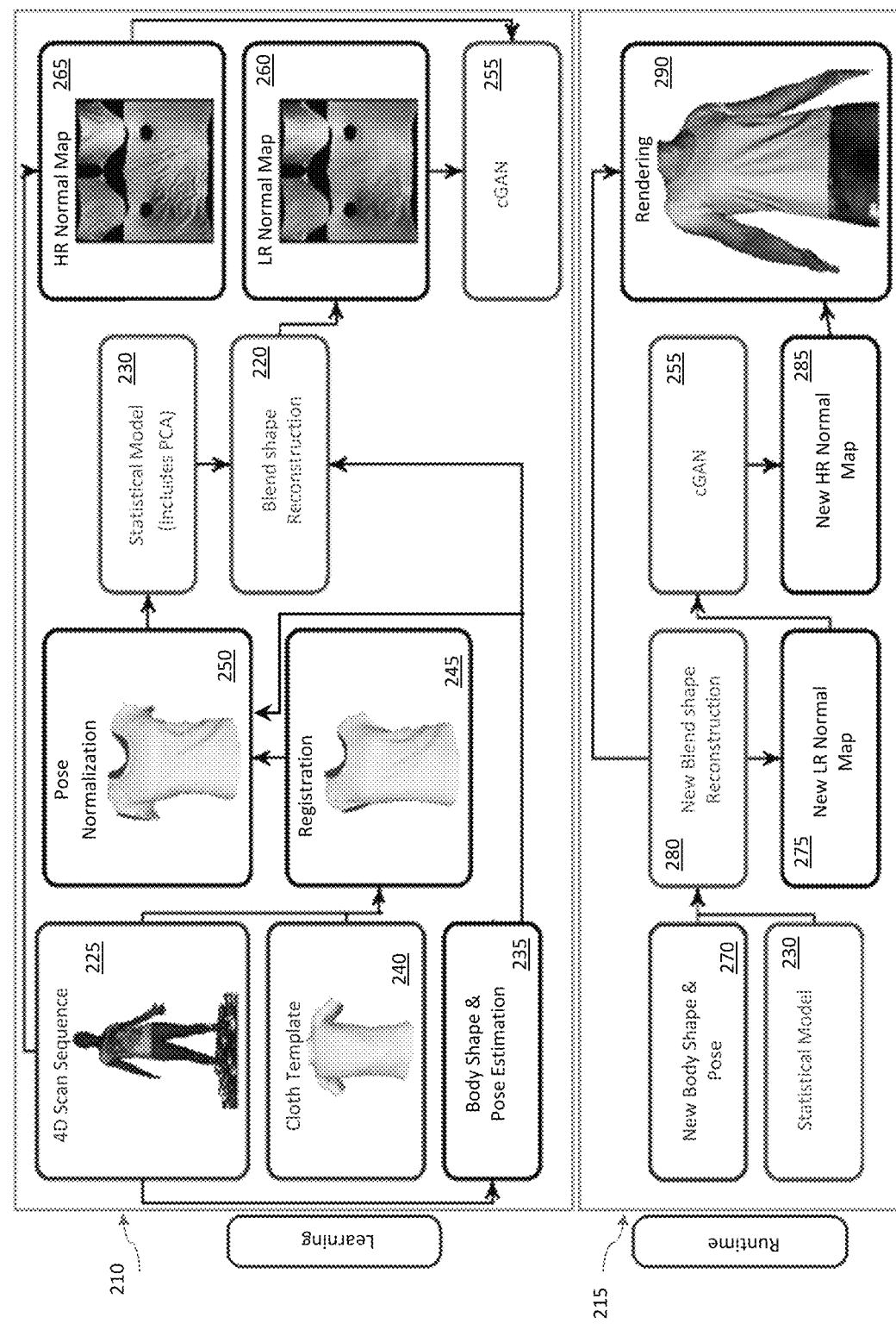
FIG. 2 illustrates a block diagram of an example of a data-driven framework for generating clothing models in one embodiment.

FIG. 2 illustrates a block diagram of an example of a data-driven framework for generating accurate and realistic clothing models in accordance with one embodiment. In particular embodiments, the framework 200 comprises a learning phase 210 and a runtime phase 215. During the learning phase 210, a statistical model learns from real-world data to reconstruct global shape deformations. A neural network is also trained during the learning phase 210 to generate fine details on normal maps from lower resolution normal maps. During the runtime phase 215, the learned models may be used to reconstruct shape and geometric details given a priori body shape and pose.

In particular embodiments, during the learning phase 210, reconstruction of global shape deformations, such as blend shape reconstruction 220, can be learned from a 4D scan sequence by using, for example, a statistical model 230. The 4D scan sequence may be a 3D scan, over a period of time, of a moving person who is wearing a clothing item of interest (e.g., a T-shirt). Each frame of the 4D scan sequence may be used to generate a high-resolution scanned 3D mesh model 225 of the clothing item at a particular instant in time. In particular embodiments, the clothing item of interest may have a corresponding cloth template 240. The cloth template 240 may be a predefined 3D mesh model, which may have a particular configuration (e.g., in a "T" shape pose) and may be defined using a lower resolution of polygons (relative to the scanned clothing model).

In particular embodiments, a registration 245 that corresponds to the scanned clothing item in a particular frame of the 4D scan sequence (or the corresponding scanned 3D mesh model 225) may be generated based on the scanned 3D mesh model 225 and the cloth template 240. As used herein, the term "registration" refers to a 3D mesh model that represents a scanned 3D mesh model 225. In particular embodiments, to generate a registration 245, a computing system may match the scanned 3D mesh model 225 with the associated cloth template 240, aligning the boundaries and polygon/triangle vertices in a manner described in further detail below. In particular embodiments, the cloth template 240 may be transformed to conform to the scanned 3D mesh model 225 based on an optimization problem that aims to minimize certain alignment errors or losses (described in further detail below). In an embodiment where the cloth template 240 has significantly lower resolution than that of the scanned 3D mesh model 225, generating the registration 245 has the additional benefit of modeling the scanned clothing item using less data (i.e., less polygons/triangles are used), while still capturing the general contour of the scanned clothing item. Reducing the data size not only reduces memory utilization but also computational demands. Such characteristics are especially advantageous for real-time or near real-time applications and/or embodiments where the runtime device has limited hardware resources (e.g., mobile phones).

In particular embodiments, each registration 245 can be normalized. Each normalized representation of a registration 245 is referred to as a pose normalization 250. In particular embodiments, for each frame in the 4D scan sequence, a body shape and pose estimation 235 may be generated using any suitable computer vision algorithm (e.g., based on a part-based model designed to model and detect human skeleton). In particular embodiments, the body shape and pose estimation 235 may be represented by a set of joints (e.g., corresponding to the body's elbows, knees, hips, shoulders, etc.), defined in a 3D coordinate system. The body shape and pose estimation 235 may be factored out of the registration 245 to generate a normalized version, which is represented by pose normalizations 250 in FIG. 2. In particular embodiments, each of the pose normalizations 250 may be represented by a mean shape plus offsets.

In particular embodiments, a statistical model 230 for the clothing item may be generated by learning from the pose normalizations 250 associated with multiple frames of the 4D scan sequence. In particular embodiments, Principal Component Analysis (PCA) may be used to statistically learn from the offsets of the pose normalizations 250 to find k principal components that influences the detected clothing deformation. Through PCA, k vectors corresponding to the principal components may be learned. One advantage of using PCA is to reduce the dimensionality of how a clothing deformation is represented. As previously mentioned, the pose normalizations 250 may be represented by a mean shape plus offsets. The number n of offsets may directly correlate to the number of polygons used to model the clothing item and could therefore be large. By reducing the data representation of the clothing deformation to k parameters, the complexity of solving the deformation is significantly reduced.

In particular embodiments where a deformation is represented by k parameters (corresponding to the k vectors generated using PCA), a blend shape function may be learned to generate k parameters based on a given a body shape and pose estimation (e.g., the body shape and pose estimation 235). In particular embodiments, the blend shape function may be a machine-learning model that is trained to predict k parameters based on a body shape and pose estimation (which may be represented by j joints) and/or other features (e.g., pose velocity) of a detected subject (e.g., human) for whom clothing is to be generated. In particular embodiments, the machine-learning model may be trained using a training data set. Each training sample of the training data set may include the body shape and pose estimation 235, which may be generated based on the corresponding frame of the 4D scan sequence, along with a ground-truth prediction target, which may be the known k parameters generated based on the learned PCA model. The machine-learning model may be implemented using any suitable model, such as a neural network or regression.

Once trained, the blend shape function and the PCA model may be used to generate a blend shape reconstruction 220 of a 3D mesh model of the clothing item of interest. For example, given a body shape and pose estimation 235, the blend shape function may be used to generate k parameters. The k parameters, in turn, may be processed using the PCA model (the k vectors corresponding to the most significant principal components). The result may be used to deform the mean shape and generate a blend shape reconstruction 220 (also referred to as a global shape).

In particular embodiments, the blend shape reconstruction 220 associated with the 4D scan sequence may be used to train a machine-learning model to generate high-resolution normal maps. In particular embodiments, a neural network, such as a conditional Generative Adversarial Network (cGAN) 255, is learned from low-resolution (LR) normal maps 260 and high-resolution (HR) normal maps 265 for generating the fine details on normal maps. The low-resolution normal maps 260 may be generated based on the normal information of the polygons that form the blend shape reconstruction 220. The high-resolution normal maps 265 may be generated from the high-resolution scanned 3D mesh model 225. Each training sample used for training the cGAN 255 may include the low-resolution normal maps 260 (the input) and the high-resolution normal maps 265 (the ground truth). Through training, the cGAN network may learn how to generate a high-resolution normal map 265 given a low-resolution normal map 260.

During the runtime phase 215, the models that were trained during the learning phase 210 may be used to render a realistic clothing item on a person with a given pose. In particular embodiments, given a new body shape and pose 270 of a real person or a virtual person, the learned statistical model 230 may generate a new blend shape reconstruction 280 (based on the learned PCA model and blend shape function). The new blend shape reconstruction 280 may then be used to create a new LR normal map 275. The learned conditional Generative Adversarial Network (cGAN) 255 outputs new HR normal maps 285 with the fine details based on the input of the new LR normal map 275. Finally, the new HR normal maps 285 with fine details can be rendered on the new blend shape reconstruction 280 in a step 290, resulting in realistic cloth deformation on the new body shape and pose 270.

As discussed above with reference to FIG. 2, particular embodiments may generate a deformation subspace model to represent cloth deformations. In particular embodiments, the cloth deformations can be modeled by learning a linear subspace model that factors out body pose and shape. In particular embodiments, the model can be learned from real data, such as the 4D scan sequence of people wearing clothes, and deformations can be applied per vertex for speed and flexibility regarding graphics pipelines. The cloth deformations can be represented compactly and with high realism using the modeling strategy. At a high level, particular embodiments may first compute the robust template-based non-rigid registrations 245 from the 4D scan sequence, then the clothing deformation statistical model 230 is derived, and finally, a regression model is learned for pose retargeting. Details of this process will be described in further detail below.

In particular embodiments, clothing data may be captured using 4D scans. FIG. 3(A) illustrates an example of one frame of a 4D scan sequence. In particular, FIG. 3(A) illustrates the frame of the 4D scan sequence of FIG. 2. For each type of clothing (e.g., a T-shirt), a corresponding 4D scan sequence, can be captured with various frame rates and have a plurality of frames. For example, a 4D scan sequences is captured at 60 frame-per-second (fps) and has 10.8k frames for 3 minutes of a human in motion. In particular embodiments, a human subject 310 is dressed in a full-body suit (e.g., green bodysuit) to facilitate template registration, with one piece of clothing (e.g., a T-shirt) having distinguished colored boundaries (e.g. orange colored boundaries 320).

Figure 3B:
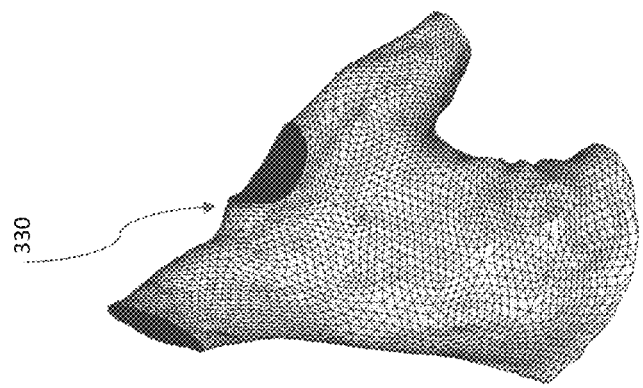
FIG. 3(B) illustrates an example of a 3D clothing model using surface mesh.
Figure 3A:
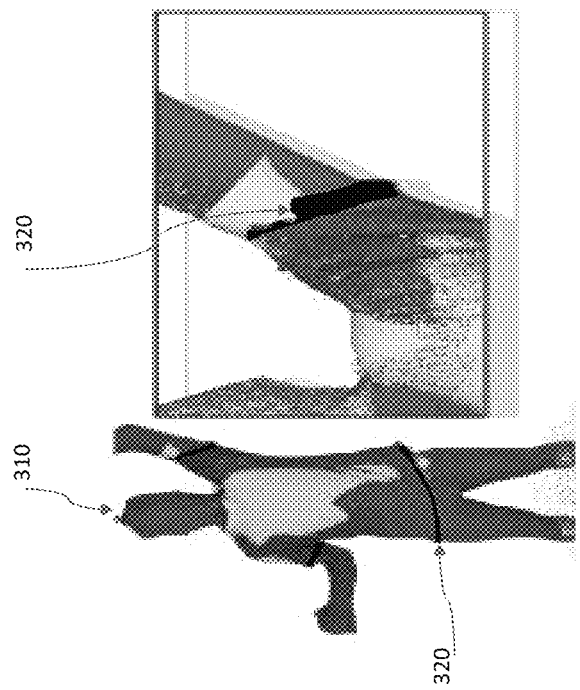
FIG. 3(A) illustrates an example of one frame of a 4D scan sequence in one embodiment.

FIG. 3(B) illustrates an example of a 3D surface mesh in one embodiment. In particular, each frame of the 4D scan sequences can comprise a 3D surface mesh 330 with around 200k vertices yielding very detailed folds on the surface of the 3D surface mesh 330. However, the surface of the 3D surface mesh 330 can be partially corrupted by holes and noise. The setup of the full-body suit with one piece of clothing allows color-based 3D clothing extraction of the clothing item. The 3D scans of the person in motion over time (i.e. the $4^{th}$ dimension) is referred as 4D scan. In particular embodiments, capturing only one piece of garment can prevent occlusions where clothing normally overlaps (e.g., waistbands) and clothing can be freely combined with each other.

Figure 3C:
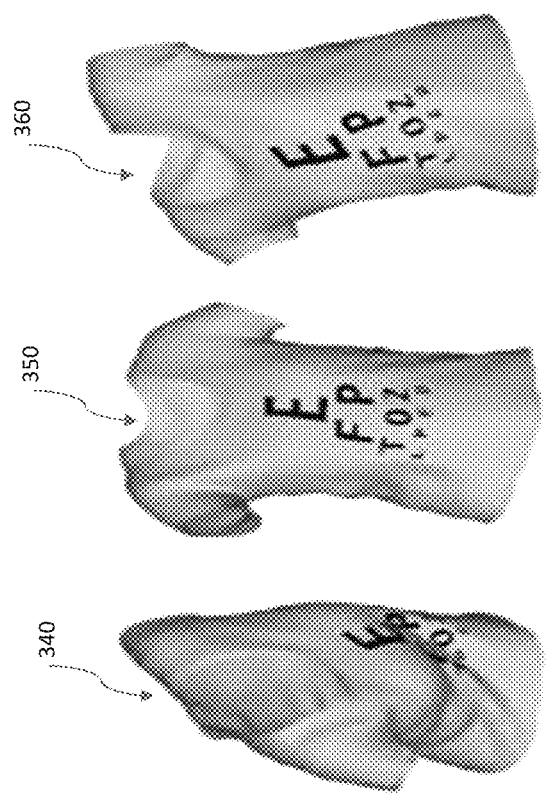
FIG. 3(C) illustrates examples of new blend shape reconstructions in one embodiment.

FIG. 3(C) illustrates an example of new blend shape reconstruction in one embodiment. The new blend shape reconstruction 280, as shown in FIG. 2, can be reconstructed in accordance with the new body shape and pose 270 in FIG. 2. The new blend shape reconstruction 280 can comprise a plurality of frames or poses reconstruction including reconstructions 340, 350, and 360.

After the 4D scan sequence is captured, a 3D body shape and pose can be estimated at each frame of the 4D scan sequence. In particular embodiments, a skeleton with j joints can be described by 7 parameters representing rotation, translation, and bone length, wherein j is an integer greater than 1. The joint parameters can also be adjusted to the estimated body shape. The posed human body can be obtained using a linear blend skinning function S: $\mathbb{R}^{3 \times v} \times \mathbb{R}^{7 \times j} \to \mathbb{R}^{3 \times v}$ that transforms v vertices, or any subset thereof, of a 3D deformable human template in normalized pose (e.g., T-pose) to a pose defined by j skeleton joints.

A clothing template T can be defined by choosing a subset of the human template with consistent topology. In particular embodiments, the clothing template T may contain enough vertices to model the clothing deformations (e.g., 5k vertices for a T-shirt), as shown in FIG. 3(B). The clothing template T then can be registered to the 4D scan sequence of FIG. 2 using a variant of non-rigid Iterative Closest Point (ICP) based on grid deformation. The following objective function $\varepsilon_{reg}$, may aim at optimizing affine transformations of grid nodes, and may be iteratively minimized using Gauss-Newton method:

$$\varepsilon_{reg} = \varepsilon_{data} + \omega_r \cdot \varepsilon_{rigid} + \omega_s \cdot \varepsilon_{smooth} + \omega_b \cdot \varepsilon_{bound}, \qquad (1)$$

where the data term $\varepsilon_{data}$ aligns template vertices with their nearest neighbors on the target scans, $\varepsilon_{rigid}$ encourages each triangle deformation to be as rigid as possible, and $\varepsilon_{smooth}$ penalizes inconsistent deformation of neighboring triangles. In addition, introduction of the energy term $\varepsilon_{bound}$ can ensure alignment of boundary vertices, which may be unlikely to occur without taking into consideration of the energy term $\varepsilon_{bound}$. The weight of each of the parameters in the function above may be defined by experiments (e.g., $\omega_r = 500$, $\omega_s = 500$, and $\omega_b = 10$).

In particular embodiments, during the data capture, the boundaries of the clothing can be marked in a distinguishable color and corresponding points can be assigned to the set $B_S$. The set of boundary points on the template are represented by $B_T$. Matching point pairs in $B_S \times B_T$ can be distributed equally among the scan boundary points and the template boundary points and can ideally capture all details in the folds of the garments. However, not all details in the folds of the garments can be captured if each template boundary point in $B_T$ is simply paired with the closest scan boundary point in $B_S$ as seen in FIG. 4(A).

Figures 4A, 4B:
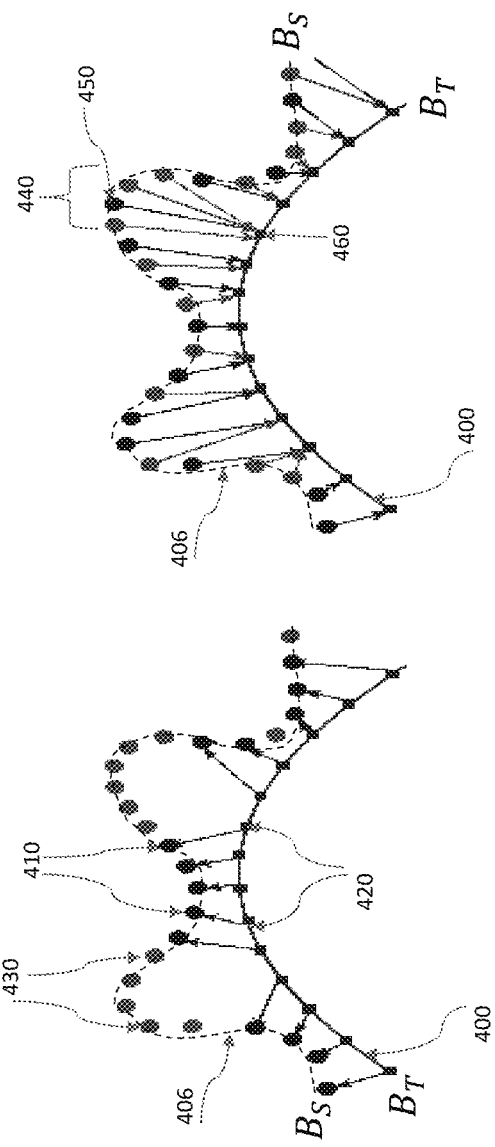
FIG. 4(A) illustrates a strategy for boundary alignment in one embodiment.
FIG. 4(B) illustrates another strategy for boundary alignment in another embodiment.

FIG. 4(A) illustrates a strategy for Boundary Alignment in one embodiment. In particular, FIG. 4(A) illustrates boundary alignment of scan boundary points set $B_S$ and template boundary points set $B_T$, wherein the scan boundary points set $B_S$ and template boundary points set $B_T$ comprise points that are equally distributed on the respective boundaries. The template boundary points set $B_T$ is equally distributed on a template boundary 400 which is denoted as a solid line shown in FIG. 4(A). The scan boundary points set $B_S$, which can have significant more points than the template boundary points set $B_T$, is equally distributed on a scan boundary 406 which is denoted as a dashed line. A portion of the scan boundary points set $B_S$, such as scan boundary points 410, can be paired with respective template boundary points, such as template boundary points 420. The pairings are represented by arrows, as shown in FIG. 4(A). In the FIG. 4(A), pairing each point of the template boundary points set $B_T$ with the closest scan boundary point nearby, such as the scan boundary points 410, can lead to ignorance of distant details, such as unpaired scan boundary points 430 (i.e., the points are not paired with any template boundary points by arrows). The ignorance of distant details may result in loss of deformation details in the reconstruction.

FIG. 4(B) illustrates another strategy for Boundary Alignment in another embodiment. In particular, FIG. 4(B) illustrates boundary alignment of the scan boundary points set $B_S$ and template boundary points set $B_T$, wherein the scan boundary points set $B_S$ and template boundary points set $B_T$ comprise points that are equally distributed on the respective boundaries. The template boundary points set $B_T$ is equally distributed on a template boundary 400 which is denoted as a solid line shown in FIG. 4(B). The scan boundary points set $B_S$, which can have significant more points than the template boundary points set $B_T$, is equally distributed on a scan boundary 406 which is denoted as a dashed line. Contrary to FIG. 4(B), where at least a subset of the scan boundary points set $B_S$ is unpaired with any point of the template boundary points set $B_T$, each point of the scan boundary points set $B_S$ in FIG. 4(B) is paired with one point of the template boundary points set $B_T$. Since all the scan boundary points are paired with the template boundary points, more details can be captured, and less distant details may be ignored, resulting in less loss of deformation details in the reconstruction.

In particular embodiments, as shown in FIG. 4(B), one template boundary point can be paired with multiple scan boundary points. For example, a subset 440 of scan boundary points can be paired with a single template boundary point 460. The subset 440 and respective template boundary point 460 can be paired in accordance with various formulas. In particular embodiments, a match $s_t \in B_S$ for each template boundary point $t \in B_T$ can be selected via the following formula:

$$s_t = \max_{s \in C} \|t - s\| \text{ with } C = \left\{ s' \in B_S \;\middle|\; \arg\min_{t' \in B_T} \|s' - t'\| = t \right\}. \quad (2)$$

Wherein C represents a set of scan boundary points in $B_S$ that are closest to a given template boundary point t (C can be empty), and $s_t$ represents the scan boundary point in the set C that is farthest from the template boundary point t. The match following the above formula (2) can ensure consistency along the boundary and better capture high frequency details which are potentially further away. Each point in the template boundary points set $B_T$ can be paired with the furthest scan boundary point in the subset containing closest points in the scan boundary points set $B_S$. For example, the template boundary point 460 can be paired with a corresponding scan boundary point 450 which is the furthest scan boundary point in the subset 440, wherein the subset 440 comprises all the scan boundary points whose corresponding closest template boundary point is the template boundary point 460.

Figure 5:
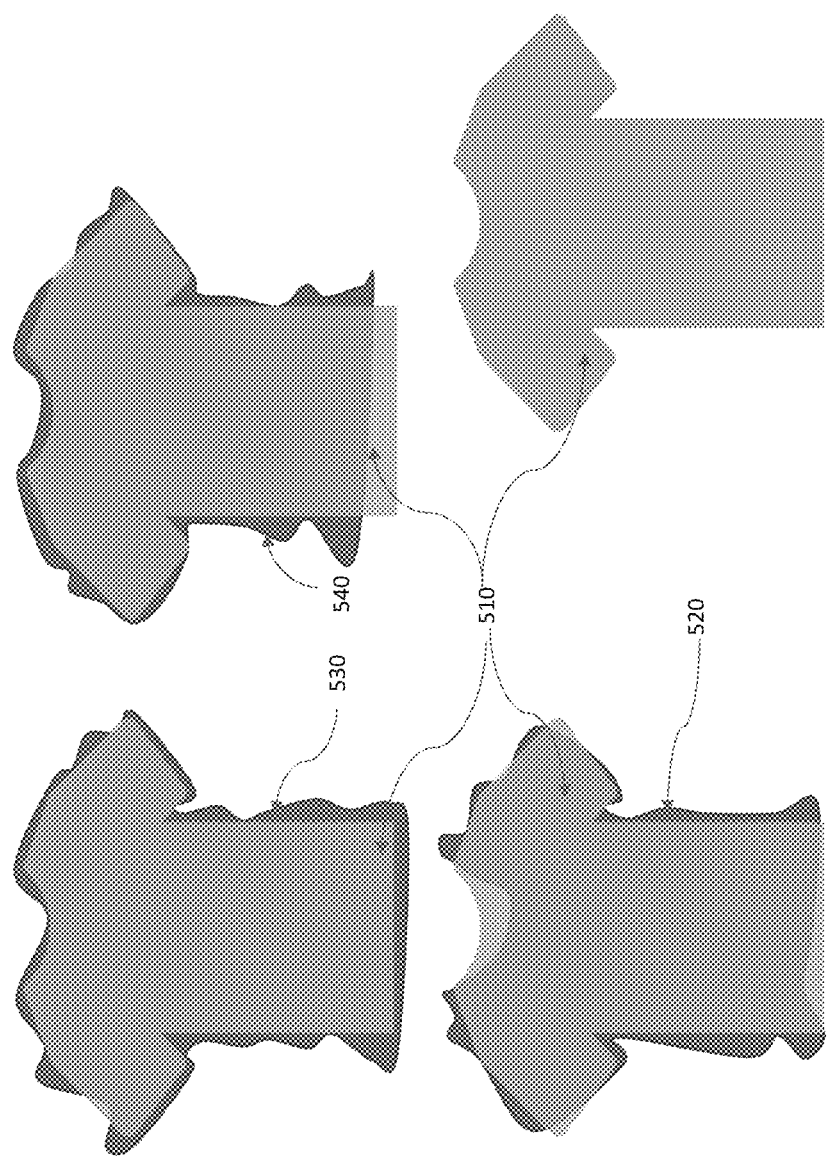
FIG. 5 illustrates an aligned garment used for computing a statistical model in an embodiment.

FIG. 5 illustrates an aligned garment used for computing a statistical model in an embodiment. In particular, FIG. 5 illustrates a shirt template 510 (which may be represented by a mean shirt shape) aligned with a respective scanned shirt 520, 530, or 540. Each shirt deformation may be represented by a combination of the shirt template 510 and offset values relative to the shirt template 510. The value of offsets, however, may be large. To reduce the dimensionality of the offsets, particular embodiments may use Principal Component Analysis (PCA) to determine a limited set of k "shape" parameters (the k most significant principal components) to represent a shirt deformation. Using PCA, a "deformation" basis {B} can be computed based on a training data set of offsets. With the deformation basis {B}, each shirt deformation may be represented by a mean shape that is offset by an application of the k most-significant deformation basis {B} on the shirt's k shape parameters, respectively. The dimensional reduction achieved using PCA significantly reduces computation, which is important for animation applications, especially real-time online animation applications. While prior work uses simulated data, particular embodiments use real data in computation.

The statistical model 230 of FIG. 2 can be computed using linear subspace decomposition by PCA. Poses $\{\theta_1, \ldots, \theta_n\}$ of all n registered meshes $\{R_1, \ldots, R_n\}$ can be factored out from the model by pose-normalization using inverse skinning: $S^{-1}(R_i, \theta_i) = \bar{R}_i \in \mathbb{R}^{3 \times v}$. The meshes in normalized pose are denoted herein with a bar. Each registration $\bar{R}_i$ can be represented by a mean shape $\bar{M}$ and a vertex offsets $o_i$, such that $\bar{R}_i = \bar{M} + o_i$, where the mean shape $\bar{M} \in \mathbb{R}^{3 \times v}$ can be obtained by averaging vertex positions:

$$\bar{M} = \sum_{i=1}^{n} \frac{\bar{R}_i}{n}.$$

The n principal affections of the matrix $O = [o_1 \ldots o_n]$ can be obtained by singular value decomposition: $O = U\Sigma V^T$. Ordered by the largest singular values, the corresponding singular vectors contain information about the most dominant deformations.

In particular, each $R_i$ can be compactly represented by $k \le n$ parameters $\{\lambda_1^i, \ldots, \lambda_k^i\} \in \mathbb{R}^k$ (instead of its $3 \times v$ vertex coordinates), with the linear blend shape function B of a registration $R_i$ and a pose $\theta_i$. Given a pose $\theta_i$:

$$B(\{\lambda_1^i, \ldots, \lambda_k^i\}, \theta_i) = S\left(\bar{M} + \sum_{l=0}^{k} \lambda_l^i \cdot V_l \cdot \theta_i\right) \approx R_i \in \mathbb{R}^{3 \times v}, \quad (3)$$

where $V_l$ is the l-th singular vector. For a given registration, $\lambda_l^i = V_l^T \bar{R}_i$ holds. In practice, choosing k=500 can be sufficient to represent all registrations with a negligible error (e.g., less than 5 mm).

A pose-to-shape prediction can be obtained based on the statistical model 230. In particular embodiments, a predictive model f may learn to take as inputs j joint poses and output a set of k shape parameters Λ. This can allow powerful applications where the deformations are induced by the poses. To take into account deformation dynamics that occur during human motion, the model can also be trained with other inputs including pose velocity, acceleration, and shape parameter history. These inputs can be concatenated in the control vector Θ, and f can be obtained using autoregressive models.

In particular embodiments, a straightforward way for solving f can be by linear regression: $F = \Lambda \cdot \Theta^\dagger$, where F is the matrix representation of f, and † indicates the Moore-Penrose inverse.

In particular embodiments, to obtain non-linear mapping, the components of Θ and Λ can be considered as multivariate time series, and a deep multi-layer recurrent neural network (RNN) can be trained. A sequence-to-sequence encoder-decoder architecture with Long Short-term Memory (LSTM) units can be well suited as it allows continuous predictions, while being easier to train than RNNs and outperforming shallow LSTMs. The Θ can be composed with 7×j joint parameter poses, and velocity and acceleration of the joint root. In particular embodiments, each training sample in a training data set may include j joint poses (along with corresponding data relating to velocity, acceleration, etc.) and k shape parameters Λ being the corresponding ground truths.

Figure 6:
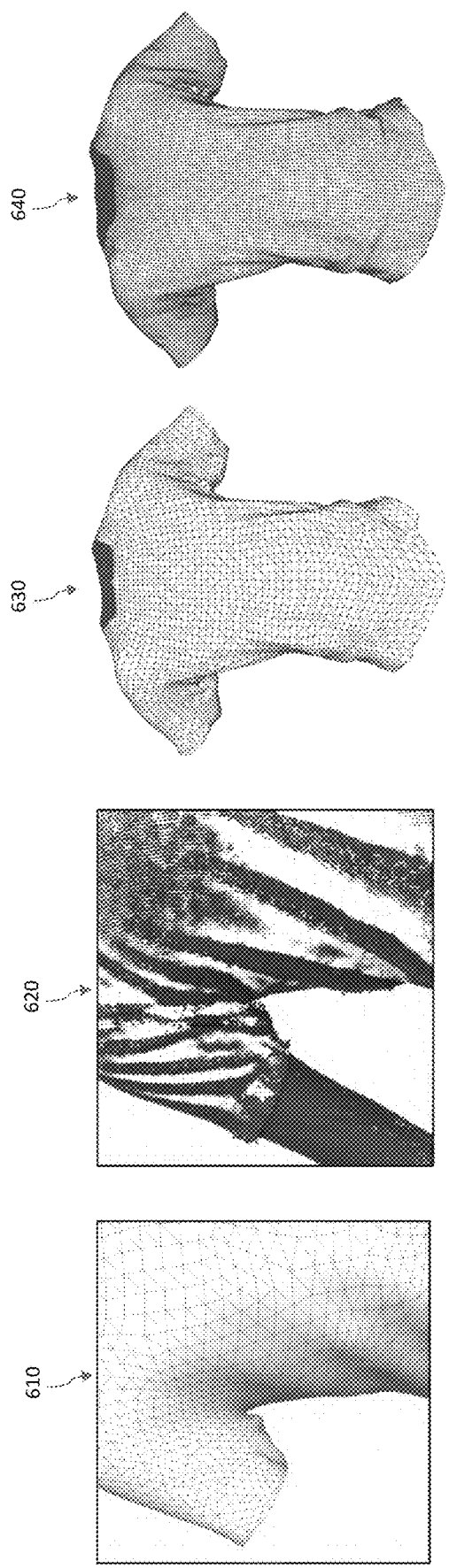
FIG. 6 illustrates examples of global shapes of 3D clothing models reconstructed using the predictive model.

In particular embodiments, the predictive model f described above may be used to output a global shape of a shirt based on a pose input. The global shape, however, may lack sufficient observable geometric details. FIG. 6 illustrates examples of global shapes of 3D clothing models reconstructed using the predictive model. The shown 3D clothing model 610 is a reconstruction of the scanned clothing data 620. While the general shape of the 3D clothing model 610 is well recovered, many visible or high frequency details are missing in the reconstructed 3D clothing model 610. Increasing the resolution of the mesh, such as higher-resolution meshes 630 and 640, may still be insufficient to recover the high frequency details. As previously mentioned, template-based methods and subspace-based methods may not be able to recover every detail, such as fine cloth wrinkles, due to resolution and data scaling limitations, as illustrated in FIG. 6. In order to recover all observable geometric details, encoded normal maps are introduced in particular embodiments.

Figure 7:
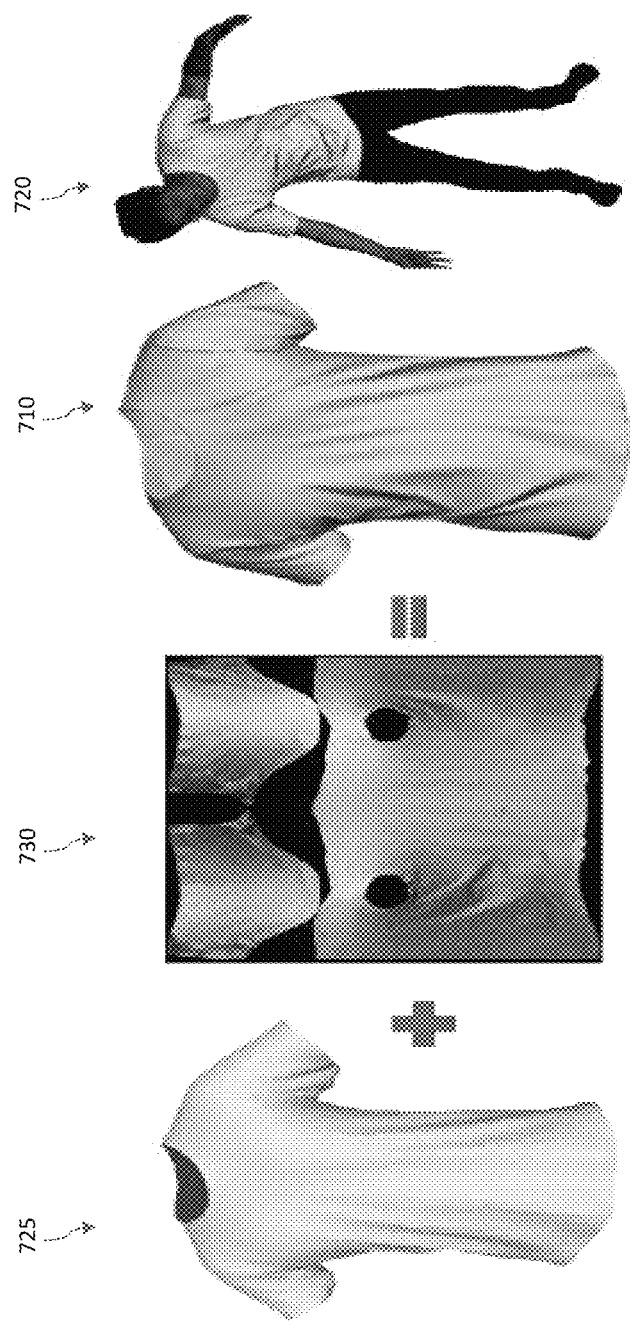
FIG. 7 illustrates, conceptually, the components used to reconstruct an accurate and realistic virtual shirt in an embodiment.

FIG. 7 illustrates, conceptually, the components used to reconstruct an accurate and realistic virtual shirt in an embodiment. In particular, FIG. 7 illustrates a virtual shirt 710, generated using particular embodiments described herein, being seamlessly added on top of an animated virtual human 720 (e.g., a computer-generated or scanned subject). Based on a given body pose, particular embodiments may generate a global shape 725 of a 3D clothing model, such as a T-shirt. Fine details of the clothing item may be encoded in a normal map 730. In particular embodiments, the normal map 730 may be an image that contains normal information at each pixel. To automatically add fine details on the fly to reconstructed clothing, particular embodiments generate the normal map 730 using a generative adversarial network (GAN). In particular, the network can induce temporal consistency on the normal maps to increase realism in animation applications. After the normal map 730 is applied, rendering of the clothing item can be handled by a 3D engine used for data visualization. The normals in the normal map can be represented in global coordinates or in tangent space coordinates.

Figure 8:
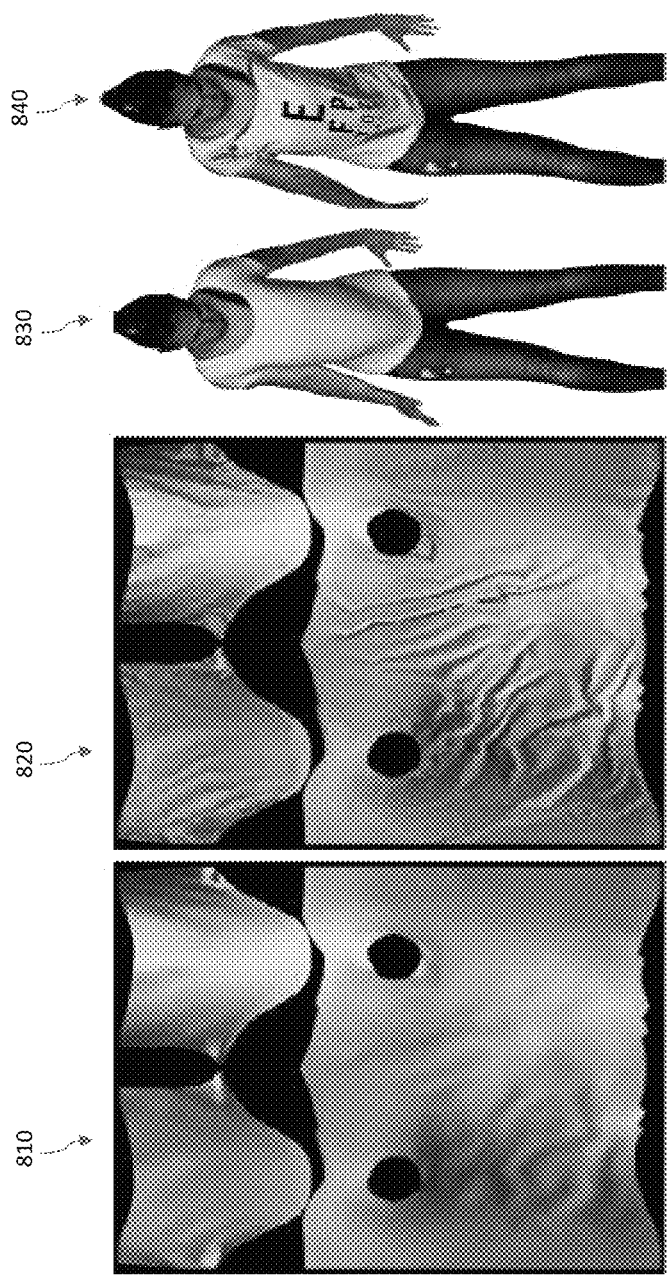
FIG. 8 illustrates examples of normal maps and their visual effects.

FIG. 8 illustrates examples of normal maps and their visual effect, according to an embodiment. In particular, FIG. 8 illustrates a low-resolution input normal map 810 and a high-resolution target normal map 820, which may be generated from a scan. Details and noise are visible on the high-resolution normal map 820. The high-resolution normal map 820 may include areas with no normal information (e.g., such information is not available from the scan). The human model 830 provides an example of a virtual T-shirt that is rendered without using a normal map and the human model 840 provides an example of a virtual T-shirt for which a normal map is used. As shown in this example, the T-shirt of the human model 840 looks much more realistic than that of the human model 830.

In particular embodiments, a high-resolution normal map may be generated from a low-resolution normal map using a machine learning model. In particular embodiments, the training data may be prepared based on a 4D scan sequence, such as 4D scan sequence of FIG. 2, and a sequence of corresponding reconstructed garments, such as blend shape reconstruction 220 of FIG. 2. The sequence of corresponding reconstructed garments can be obtained by, for example, registration, reconstruction using blend shape or regression, as discussed previously. Clothing template meshes T can be equipped with UV maps which are used to project any pixel from an image to a point on a mesh surface, hence assigning a property encoded in a pixel to each point. Therefore, normal coordinates can be normalized and stored, similar to pixel colors, in normal maps. In particular embodiments, the training dataset then can comprise pairs of normal maps: low resolution (LR) normal maps 810 obtained by blend shape reconstruction, and high resolution (HR) normal maps 820 obtained from the scans. For LR normal maps 810, the normal at surface point (lying in a face) may be linearly interpolated from vertex normal, according to particular embodiments. For HR normal maps 820, per-pixel normals may be obtained by projection of the high-resolution observations (i.e., 4D scan) onto triangles of the corresponding low-resolution reconstruction, and then the normal information is transferred using the UV map of T. In particular embodiments, the normal maps are not directly calculated from scans, because the exact area of the garment may not be defined and the scans are not equipped with the UV maps. Also, the normals used in particular embodiments are represented in global coordinates, instead of tangent space coordinates. The reason is that LR normal maps may contain no additional information to the geometry and are therefore constant in the tangent spaced, which makes them suboptimal inputs for conditioning an adversarial neural network.

Among the network architectures designed to enhance images (i.e., super-resolution applications), prior experiments show failures of models trained on natural images, including those containing a perceptual loss term. On the other hand, cloth deformations exhibit smooth patterns (wrinkles, creases, folds) that deform continuously in time. In addition, at a finer level, materials and fabric texture also contain the high frequency details.

Figure 9:
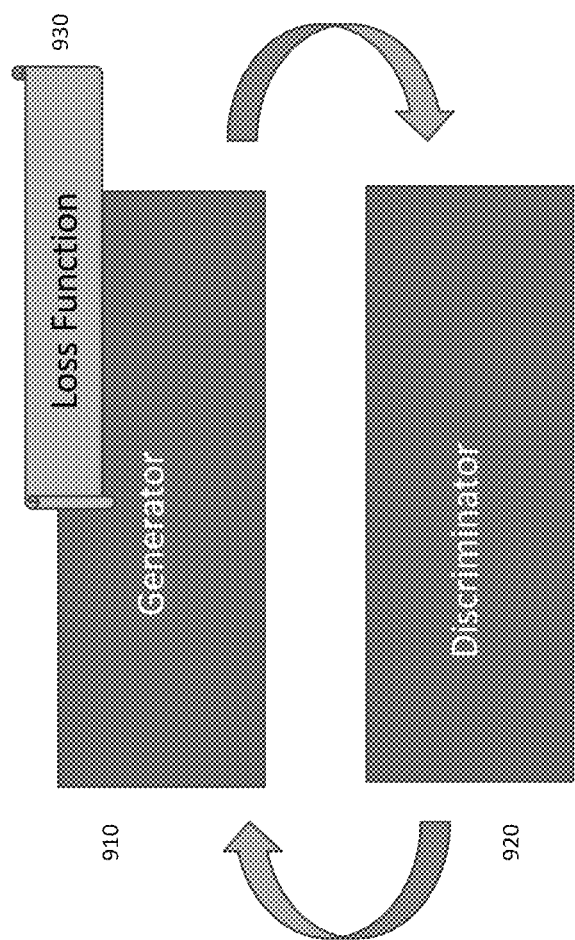
FIG. 9 illustrates a Generative Adversarial Network in an embodiment.

FIG. 9 illustrates a Generative Adversarial Network in an embodiment. In particular, FIG. 9 illustrates a generator 910 (which may be implemented as a neural network) with loss function and a discriminator 920 (which may also be implemented as a neural network). During training, each training sample may include a low-resolution normal map and a corresponding target high-resolution normal map (serving as the ground truth of the training sample). In particular embodiments, training may occur iteratively. During one training iteration, the generator 910 may take as input a low-resolution normal map from a training sample, process the information using its current neural network parameters, and generating a high-resolution normal map. The generated high-resolution normal map is then taken as input by the discriminator 920, which is tasked with determining whether the generated high-resolution normal map or the corresponding target high-resolution normal map provided in the training sample is generated (i.e., "fake") or not-generated (i.e., "real"). The correctness or incorrectness of the discriminator's 920 prediction may then be used to influence how the parameters of the generator 910 and discriminator 920 are updated. The loss function used may be designed so that the generator 910 would progressively, through training, become better at generating "fake" high-resolution normal maps, and the discriminator 920 would progressively become better at detecting "fake" versus "real" normal maps. Once training completes (e.g., after the loss is below a certain threshold or a sufficiently large set of training samples have been used), the generator 910 may be used in operation to generate high-resolution normal maps from inputs of low-resolution normal maps (e.g., the HR normal map 285 is generated from inputs of the LR normal map 275 in FIG. 2.).

In particular embodiments, the network is based on a conditional Generative Adversarial Network (cGAN). In particular embodiments, a convolution-batchnorm-ReLu structure and a U-net are used in the generative network, since it is desirable that latent information to be transferred across the network layers and the overall structure of the image to be preserved. This can be accomplished by skip connections. In particular embodiments, the discriminator 920 may only penalize structure at the scale of patches, and work as a texture loss. The network can be conditioned by the low-resolution normal map images, such as size of 256×256, which then can be enhanced with fine details learned from the real data normal maps (e.g., the ground truth training target). In particular embodiments, temporal consistency can be achieved by extending the L1 network loss term. For compelling animations, it is not only important that each frame looks realistic, but also no sudden jumps in the rendering occur. To ensure smooth transition between consecutively generated images across time, an additional loss $L_{loss}$ to the GAN objective is introduced, such as loss function 930, which can penalize discrepancies between generated images $I_{gen}$ at t and expected images $I_{gt}$ (from training dataset) at t−1:

$$L_{loss} = \underbrace{\|I^t_{gen} - I^t_{gt}\|_1}_{L_{data}} + \underbrace{\left|\sum_{i,j} (I^t_{gen} - I^{t-1}_{gt})_{i,j}\right|}_{L_{temp}}, \quad (4)$$

where $L_{data}$ helps to generate images near to ground truth in an $L_1$ sense (for less blurring). The temporal consistency term $L_{temp}$ is meant to capture global fold movements over the surface, and conceptually enforces the idea that differences between consecutive frames should be minimized. For example, experiments have shown that a loss function without the temporal consistency term may result in geometric noise appearing or disappearing instantly across consecutive frames. In contrast, when the temporal consistency term is used, geometric continuity is better preserved between consecutive frames. Thus, adding the temporal consistency term improves the generated results, especially for videos with consecutive frames. The term $L_{temp}$ may not take spatial proximity into account in particular embodiments. In particular embodiments, the temporal consistency can be based on the $L_1$-norm and $L_2$-norm.

In one example, the training process may be configured as follows. The 4D scan sequences may be captured using a temporal-3dMD system (4D) at 60 fps. Each frame of the 4D scan sequence may consist of a colored mesh with 200K vertices. The cGAN network may be trained on a dataset of consecutive frames. The U-net auto-encoder can be constructed with 2×8 layers, and 64 filters in each of the first convolutional layers. The discriminator can use patches of size 70×70. $L_{data}$ weight can be set to 100, $L_{temp}$ weight can be set to 50, while GAN weight is 1. The images may have a resolution of 256×256, 512×512, or any other suitable resolution.

Comparison of results to different approaches shows that, the methods of DeepWrinkles can add high frequency details seen in the scan to the reconstructed surface, while the physics-based simulation done by a 3D artist and linear subspace reconstruction with coefficients derived from the registrations cannot. In particular embodiments, the level of reconstruction details in the input may be adjusted to further improve the realism of the final rendered clothing. In particular embodiments, the input images in the training data set may be replaced by normal maps constructed from the blend shapes with, e.g., 500, 200, and 100 basis functions and one set from the regression reconstruction. It has been observed through experimentation that 500 basis functions seem sufficient for a reasonable amount of detail in the result.

Figure 10:
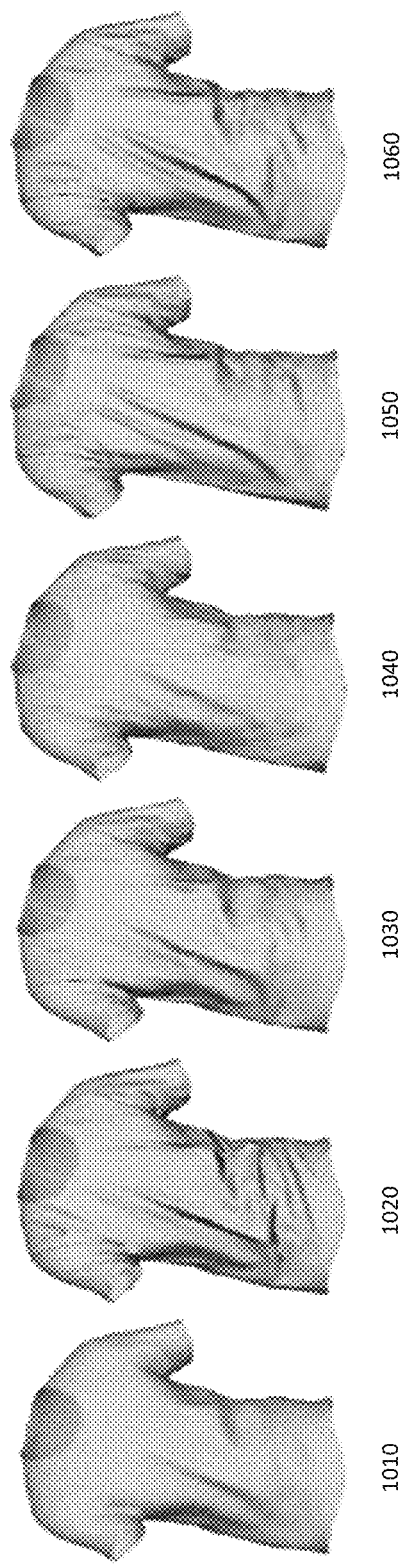
FIG. 10 illustrates examples of different training results in an embodiment.

FIG. 10 illustrates examples of different training results in an embodiment. Shirt 1010 is an example of a global shape with no normal map and shirt 1020 is an example of a target normal map (i.e., the ground truth used in the training). Shirt 1030 is an example learned from registration normal map with temporal consistency, shirt 1040 is learned from blend shape with 200 basis functions and temporal consistency, shirt 1050 is learned from blend shape with 500 basis functions and temporal consistency, and shirt 1060 is learned from registration normal map without temporal consistency.

In particular embodiments, a final goal is scanning one piece of clothing in one or several sequences and then transferring the scans onto new persons with new movements on the go. In particular embodiments, this retargeting process may be based on body poses. Various combinations of control vectors Θ may be used in particular embodiments, including but not limited to, pose, shape, joint root velocity and acceleration history. The joint parameters can be restricted to those directly related to each piece of clothing to reduce the dimensionality. In the case of shirts, the restriction may leave, e.g., 469 parameters related to the upper body. In general, linear regression may be generalized best but smoothed out a lot of overall geometric details, even in the training set. For example, on 9213 evaluated frames for 500 and 1000 blend shapes, $MSE_{500}$=2.902 and $MSE_{1000}$=3.114 respectively.

On the other hand, an encoder-decoder with LSTM units is trained (4 layers with dimension 256), using inputs and outputs equally of length 3 as discussed previously. Promising results can be obtained, $MSE_{rnn}$=1.892.

In particular embodiments, the retargeting process may also consider body shapes. As discussed previously, clothing can be represented with folds as offsets of a mean shape. The same can be done with a human template and persons with different body shapes. Each person $\overline{P}_I$ in normalized pose can be represented as an average template plus a vertex-wise offset $\overline{P}_I = \overline{T} + o'_I$. Given the fact that the clothing mean shape $\overline{M} = \overline{T}|_M + o'|_M$ contains a subset of vertices of the human template, it can be adjusted to any deformation of the template by taking $\overline{M}_o = \overline{M} + o_{i|M}$. $|M$ restricts vertices of the human template to those used for clothing. Then the mean in the blend shape can simply be replaced by $\overline{M}_{o'}$. Equation 3 then becomes:

$$B(\{\lambda^i_1, \ldots, \lambda^i_k\}, \theta_i) = S\left(\overline{M}_{o'} + \sum_{l=0}^{k} \lambda^i_l \cdot V_l \cdot \theta_i\right) \approx P_i, \quad (5)$$

Replacing the mean shape can affect surface normals. Hence, in particular embodiments, the normal maps may be used in tangent space at rendering time to make them applicable to any body shape.

Figure 11:
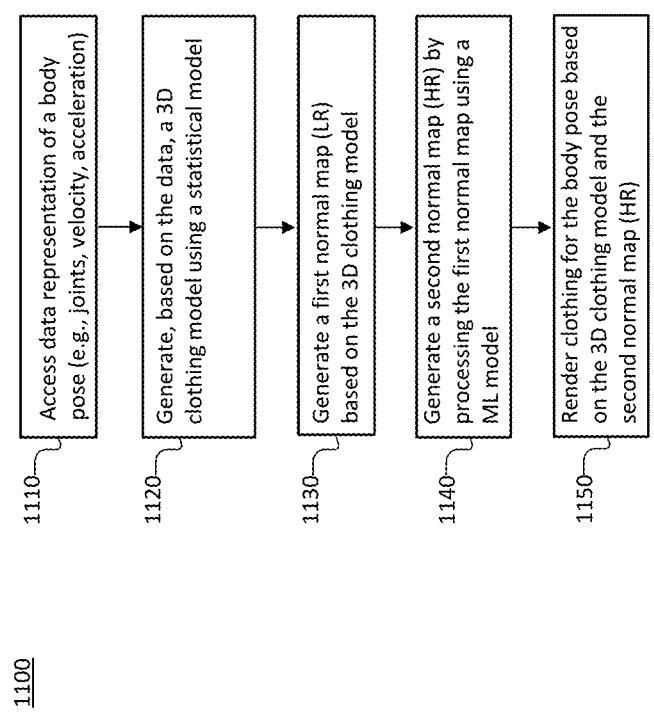
FIG. 11 illustrates an example method for generating accurate and realistic clothing deformation in further embodiments.

FIG. 11 illustrates an example method 1100 for generating accurate and realistic clothing models for a given body pose. The method may begin at step 1110, where a computing system (e.g., a laptop, desktop, smartphone, virtual-reality or augmented-reality device, etc.) may accessing a data representation of a body pose. As previously discussed, the representation of the body pose may be a set of joints of the body pose (e.g., coordinates of where particular joints, body locations relative to joints, head, or other body part are deemed to be located), the velocity and/or acceleration of each joint, and/or the velocity and/or acceleration of the body as a whole. In particular embodiments, the body pose may be of a person or other real-life animal or object captured in an image or video frame, in which case the body pose data may be generated using computer-vision technology (e.g., a machine-learning model trained to predict the location of joints or body parts of interest). In other embodiments, the body pose may be of a virtual person, avatar, or any other computer-generated object with known body pose information.

At step 1120, the system may generate, based on the data representation, a 3D clothing model (e.g., the blend shape reconstruction shown in FIG. 2) for the body pose using a statistical model (e.g., the statistical model 230 shown in FIG. 2). The statistical model, as previously described, may be generated based on a sequence of 3D scan data of a clothing item worn by a person in motion (e.g., the aforementioned 4D scan data). In particular embodiments, the sequence of 3D scan data may be used to generate a corresponding sequence of deformed clothing templates (e.g., the registrations and normalized registrations), from which the statistical model may learn. In particular embodiments, generation of the 3D clothing model may include generating, based on the data representation of the body pose, the aforementioned k shape parameters using a predictive model f (e.g., machine-learning model such as a regression model or neural network), and then applying the statistical model (e.g., learned using PCA) to the k shape parameters to transform it into the 3D clothing model.

In particular embodiments, the 3D clothing model, which may be considered as a global, more general clothing model, may lack the desired level of wrinkle detail. Thus, particular embodiments may further use a machine-learning model to generate the desired details in the form of a normal map. For example, at step 1130, the system may generate a first normal map, which may have relatively lower resolution or detail than desired, based on the 3D clothing model. Then at step 1140, the system may generate a second normal map, which may have relatively higher resolution or detail compared to the first normal map, by processing the first normal map using the machine-learning model. As previously described, the machine-learning model may be a Generative Adversarial Network that is trained to generate normal maps with higher levels of detail from normal maps with relatively lower levels of detail. For instance, the machine-learning model may be trained using training samples that include low-resolution normal maps generated based on 3D clothing models, with each of the training samples being associated with a target high-resolution normal map generated based on scanned clothing data.

At step 1150, the system may render clothing for the body pose based on the 3D clothing model and the second normal map. An example of the result is shown in FIG. 2 at label 290. In particular embodiments, the high-resolution normal map may be used to define the detailed contours for the more general 3D clothing model. The normal information in the high-resolution normal map may be mapped to points (or polygons) of the 3D clothing model. In particular embodiments, when a rendering engine is trying to determine the proper color for a particular visible point on the 3D clothing model, it may look up the corresponding normal information from the high-resolution normal map. The normal information at that point may then be used to determine the proper light reflection and color that should be rendered to produce realistic clothing for the body pose.

Therefore, as described herein, particular embodiments provide a data-driven framework to capture and reconstruct clothing in motion from 4D scan sequences. High frequency details can be added to the low resolution normal maps using a conditional adversarial neural network. An additional term of temporal loss can be introduced to the GAN objective that preserves geometric consistency across time and shows qualitative and quantitative evaluations on different datasets. Low resolution normal maps may be created from registered data. As discussed, registration fidelity may significantly impact the cGAN training. The two modules presented in particular embodiments are complementary to achieve accurate and realistic rendering of global shape and details of clothing.

The methods of DeepWrinkles may exceed the level of detail in both physical simulation and data-driven approaches. Additionally, the space requirement of a normal map is negligible in comparison to increasing the resolution of the mesh, which makes the pipeline suitable to standard 3D engines.

Furthermore, the scanning setup can be extended to reconstruct all parts of the body with sufficient details and avoid occlusions. The methods can be applied to more diverse types of clothing and accessories such as coats or scarfs. Additionally, the normal map can be used to add the fine details like buttons or cuffs which are hard to capture in the mesh but come naturally with the normal map. The global shape can be reconstructed from a joint sequence with sufficient details and accuracy and applied to normal map enhancement. Especially for loose garments, this is a very difficult problem that has to deal with physical effects and dynamics to appear realistic.

Figure 12:
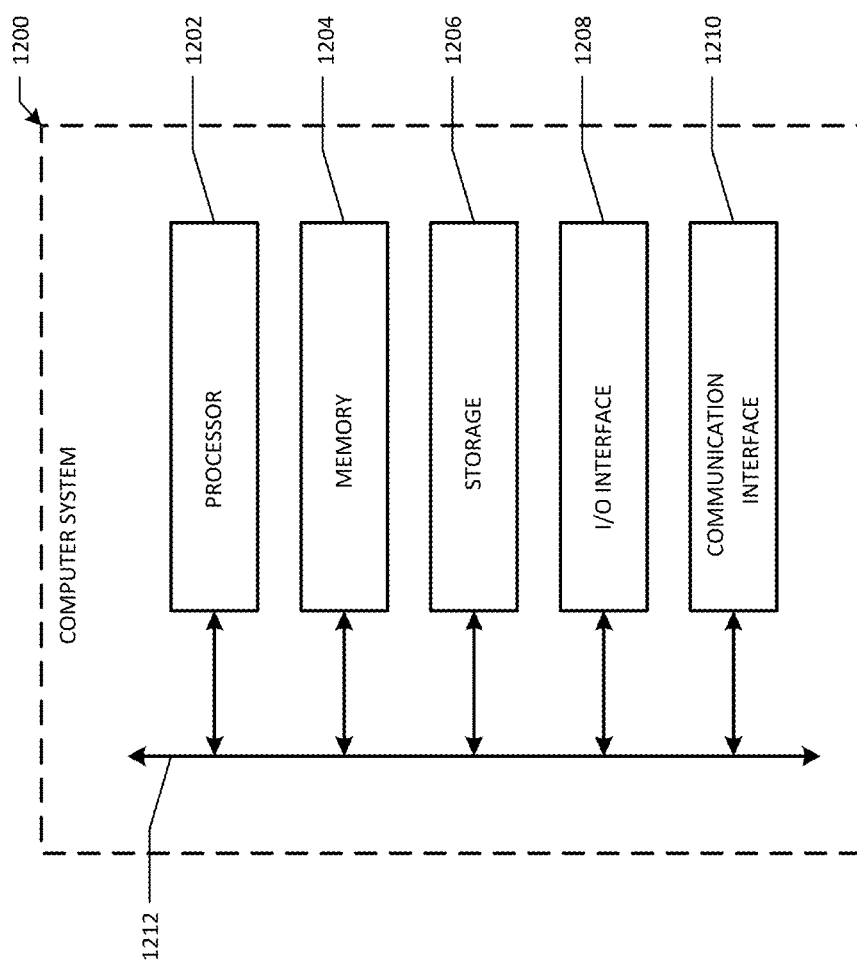
FIG. 12 illustrates an example computer system in an embodiment.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
accessing a data representation of a body pose;
generating a deformed 3D clothing geometry of a clothing item using the data representation of the body pose;
generating a low-resolution normal map image for the deformed 3D clothing geometry based on the deformed 3D clothing geometry, the low-resolution normal map image comprising pixels containing normal directions of corresponding locations on the deformed 3D clothing geometry;
generating a high-resolution normal map image by processing the low-resolution normal map image using a machine-learning model that is trained to generate normal map images with higher levels of detail from normal map images with relatively lower levels of detail, wherein the machine-learning model is trained using a set of low-resolution normal map images of clothing items and a corresponding set of high-resolution normal map images of the clothing items, the set of low-resolution normal map images having relatively lower levels of detail than the set of high-resolution normal map images; and
rendering clothing for the body pose based on the deformed 3D clothing geometry and the high-resolution normal map image,
wherein the high-resolution normal map image has relatively higher levels of detail than the low-resolution normal map image.

2. The method of claim 1, wherein the set of low-resolution normal map images of the clothing items are generated based on deformed 3D clothing geometries, wherein the set of high-resolution normal map images of the clothing items are generated based on scanned clothing data.

3. The method of claim 1, wherein the data representation of the body pose comprises coordinates that correspond to joints of the body pose.

4. The method of claim 3, wherein the data representation of the body pose further comprises velocity data, acceleration data, or both velocity and acceleration data associated with the joints.

5. The method of claim 1, wherein generating the deformed 3D clothing geometry comprises:
  generating, based on the data representation of the body pose, a predetermined number of parameters representing a clothing deformation; and
  generating the deformed 3D clothing geometry by applying a statistical model to the predetermined number of parameters.

6. The method of claim 5, wherein the statistical model is generated using Principal Component Analysis.

7. The method of claim 5, wherein the statistical model is generated based on a sequence of 3D scan data of a clothing item worn by a person in motion.

8. The method of claim 7, wherein the sequence of 3D scan data is used to generate a corresponding sequence of deformed clothing templates, wherein the statistical model is generated based on the sequence of deformed clothing templates.

9. A system comprising: one or more processors and one or more computer-readable non-transitory storage media coupled to one or more of the processors, the one or more computer-readable non-transitory storage media comprising instructions operable when executed by one or more of the processors to cause the system to:
  access a data representation of a body pose;
  generate a deformed 3D clothing geometry of a clothing item using the data representation of the body pose;
  generate a low-resolution normal map image for the deformed 3D clothing geometry based on the deformed 3D clothing geometry, the low-resolution normal map image comprising pixels containing normal directions of corresponding locations on the deformed 3D clothing geometry;
  generate a high-resolution normal map image by processing the low-resolution normal map image using a machine-learning model that is trained to generate normal map images with higher levels of detail from normal map images with relatively lower levels of detail, wherein the machine-learning model is trained using a set of low-resolution normal map images of clothing items and a corresponding set of high-resolution normal map images of the clothing items, the set of low-resolution normal map images having relatively lower levels of detail than the set of high-resolution normal map images; and
  render clothing for the body pose based on the deformed 3D clothing geometry and the high-resolution normal map image,
  wherein the high-resolution normal map image has relatively higher levels of detail than the low-resolution normal map image.

10. The system of claim 9, wherein the set of low-resolution normal map images of the clothing items and are generated based on deformed 3D clothing geometries, wherein the set of high-resolution normal map images of the clothing items are generated based on scanned clothing data.

11. The system of claim 9, wherein the data representation of the body pose comprises coordinates that correspond to joints of the body pose.

12. The system of claim 11, wherein the data representation of the body pose further comprises velocity data, acceleration data, or both velocity and acceleration data associated with the joints.

13. The system of claim 9, wherein generation of the deformed 3D clothing geometry comprises:
  generate, based on the data representation of the body pose, a predetermined number of parameters representing a clothing deformation; and
  generate the deformed 3D clothing geometry by applying a statistical model to the predetermined number of parameters.

14. The system of claim 13, wherein the statistical model is generated based on a sequence of 3D scan data of a clothing item worn by a person in motion.

15. One or more computer-readable non-transitory storage media embodying software that is operable when executed to cause one or more processors to perform operations comprising:
  access a data representation of a body pose;
  generate a deformed 3D clothing geometry of a clothing item using the data representation of the body pose;
  generate a low-resolution normal map image for the deformed 3D clothing geometry based on the deformed 3D clothing geometry, the low-resolution normal map image comprising pixels containing normal directions of corresponding locations on the deformed 3D clothing geometry;
  generate a high-resolution normal map image by processing the low-resolution normal map image using a machine-learning model that is trained to generate normal map images with higher levels of detail from normal map images with relatively lower levels of detail, wherein the machine-learning model is trained using a set of low-resolution normal map images of clothing items and a corresponding set of high-resolution normal map images of the clothing items, the set of low-resolution normal map images having relatively lower levels of detail than the set of high-resolution normal map images; and
  render clothing for the body pose based on the deformed 3D clothing geometry and the high-resolution normal map image,
  wherein the high-resolution normal map image has relatively higher levels of detail than the low-resolution normal map image.

16. The media of claim 15, wherein the set of low-resolution normal map images of the clothing items and are generated based on deformed 3D clothing geometries, wherein the set of high-resolution normal map images of the clothing items are generated based on scanned clothing data.

17. The media of claim 15, wherein the data representation of the body pose comprises coordinates that correspond to joints of the body pose.

18. The media of claim 17, wherein the data representation of the body pose further comprises velocity data, acceleration data, or both velocity and acceleration data associated with the joints.

19. The media of claim 15, wherein generation of the deformed 3D clothing geometry comprises:
  generate, based on the data representation of the body pose, a predetermined number of parameters representing a clothing deformation; and
  generate the deformed 3D clothing geometry by applying a statistical model to the predetermined number of parameters.

20. The media of claim 19, wherein the statistical model is generated based on a sequence of 3D scan data of a clothing item worn by a person in motion.

* * * * *